US012698462B2

(12) United States Patent
Bardia

(10) Patent No.: US 12,698,462 B2
(45) Date of Patent: Aug. 4, 2026

(54) FERMENTED AND DISTILLED FOOD GRADE ALCOHOL SPIRITS DERIVED FROM HEMP AND CANNABIS FEEDSTOCK WASTE STREAMS

(71) Applicant: Jaime Miguel Bardia, Greenwich, CT (US)

(72) Inventor: Jaime Miguel Bardia, Greenwich, CT (US)

( * ) Notice: Subject to any disclaimer, the term of this patent is extended or adjusted under 35 U.S.C. 154(b) by 1415 days.

(21) Appl. No.: 16/372,610

(22) Filed: Apr. 2, 2019

(65) Prior Publication Data

US 2020/0318041 A1     Oct. 8, 2020

(51) Int. Cl.

| | |
|---|---|
| *C12G 3/02* | (2019.01) |
| *B01D 3/00* | (2006.01) |
| *B01D 3/10* | (2006.01) |
| *C12G 3/08* | (2006.01) |
| *C12H 6/02* | (2019.01) |

(52) U.S. Cl.
CPC .............. *C12G 3/02* (2013.01); *B01D 3/009* (2013.01); *B01D 3/10* (2013.01); *C12G 3/08* (2013.01); *C12H 6/02* (2019.02)

(58) Field of Classification Search
CPC . C12H 6/02; C12G 3/026; C12G 3/02; C12G 3/08
USPC ........................................................ 426/592
See application file for complete search history.

(56) References Cited

U.S. PATENT DOCUMENTS

2014/0044807 A1* 2/2014 Bisterfeld Von Meer ...................
A61Q 19/00
426/11
2017/0238582 A1* 8/2017 Garnett ..................... A23L 2/52

FOREIGN PATENT DOCUMENTS

CN          104560544    * 4/2015  ............... C12G 3/04
WO   WO-2012098167 A2 * 7/2012  ............... A23L 2/04

OTHER PUBLICATIONS https://www.ncbi.nlm.nih.gov/pmc/articles/PMC3547755/pdf/2191-0855-2-65.pdf Bhatia et al An economic and ecological perspective of ethanol production from renewable agro waste: a review AMB Express (Year: 2012).*

* cited by examiner

*Primary Examiner* — Vera Stulii
(74) *Attorney, Agent, or Firm* — Robert Joseph Hess; Hess Patent Law Firm

(57) ABSTRACT

An alcohol spirits beverage made from a specific feedstock of Cannabaceae plant family agricultural waste and discarded plant components including the roots, stems, leaves and manufacturing waste streams from the medical and recreational Hemp and Marijuana industry and or industrial Hemp.

The invention establishes a standardized method whereby Hemp and Marijuana waste streams are destroyed through the anaerobic digestion that occurs during fermentation. The method converts raw and or processed Cannabaceae plant family feedstock that is cleansed, hydrolyzed, fermented and distilled to create a new category of pure food grade alcohol spirits beverage that is uniquely distinguishable by virtue of its physical specifications and sensorial properties, flavor profile, aroma and overall character that separates it into a unique category from the five (5) primary alcohol spirits beverages such as Whiskey, Vodka, Tequila, Rum and Gin.

8 Claims, No Drawings

FERMENTED AND DISTILLED FOOD GRADE ALCOHOL SPIRITS DERIVED FROM HEMP AND CANNABIS FEEDSTOCK WASTE STREAMS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE

Not applicable.

BACKGROUND OF THE INVENTION

Field of the Invention

The invention pertains to an alcohol made from a specific feedstock from the Cannabaceae plant family found in any combination of freshly harvested, partially dried fully dried Hemp and *Cannabis* agricultural waste and plant components including the roots, stems, leaves along with dry and or solvent saturated manufacturing waste streams and expired products from the medical and recreational Hemp and Marijuana industry.

The invention establishes a standardized method whereby Hemp and *Cannabis* waste streams are destroyed in a legally compliant manner through the anaerobic digestion that occurs during fermentation. The method converts raw and or processed Cannabaceae plant family feedstock that is cleansed, hydrolyzed, fermented and distilled to create a new category of pure food grade alcohol beverage that is uniquely distinguishable by virtue of its physical specifications and sensorial properties, flavor profile, aroma and overall character that separates it into a unique category from the five (5) primary alcohol spirits such as Whiskey, Vodka, Tequila, Rum and Gin.

Discussion of Related Art

With respect to the fermentation and distillation of alcohol spirits from a feedstock that is exclusively derived from the Cannabaceae plant family, such has not been a possibility in the United States because, until late 2018, United States federal law prohibited widespread cultivation of industrial Hemp.

Another barrier to entry and functional impediment is presented by the challenges encountered in hydrolyzing the cellulosic and lignocellulosic elements of Hemp into fermentable disaccharides and monosaccharides.

There has recently been the lifting of legal constraints that have restricted the widespread agricultural production of Industrial Hemp by the Agriculture Improvement Act of 2018 ordered by a roll call vote of 20-1. S. 3042, as Reported to the Senate Substitute Amendment to H.R. 2, the Farm Bill—(Jun. 27, 2018). As such, the Amendment was ratified into law by the 115$^{th}$ Congress on Dec. 11, 2018. The 2018 Farm Bill removed all *Cannabis* fiber products with less than a 0.3 percent concentration of the psychoactive element tetrahydrocannabinol ("THC") from the Controlled Substances Act.

The invention relies on a 50-state legal feedstock of industrial Hemp plants, including the roots and associated agricultural and production wastes. The unique feedstock stream positions the pure Cannabaceae plant family derived alcohol spirits invention in stark contrast to the common base agricultural ingredients that form the core supply chain for this unique mass market food grade alcohol spirits. As an example, Vodka alcohol spirits are distilled from fermented sugar beets or potatoes. Rum is distilled from fermented sugar cane syrup, juice and/or molasses. 100% Agave Tequila is mandated by Mexican law to be only distilled from fermented Blue Agave plant hearts that can only be grown in a specific area surrounding the town of Tequila Mexico. Gin originates from fermented grains that are either distilled with juniper berries and or vapor column "basket distilled" with juniper berries and in some cases a combination of aromatic ingredients. Whiskey is distilled from grain-based feedstock.

Consider that large scale industrial Hemp farming was illegal within the U.S. until H.R. 2, the Farm Bill that was signed into law on Dec. 20, 2018. The creation of a pure Cannabaceae plant family derived food grade alcohol spirits was illegal and un-economic by nature of the limited feedstock supply. Furthermore, Hemp and *Cannabis* are comprised of a high cellulosic and lignocellulosic content along with a low sugar and starch yield. To date, these key factors have rendered the Hemp plant unsuitable as an economically viable standalone feedstock for fermentation and distillation into a plant family food grade alcohol spirits.

In total compliance with existing federal and state schedule 1 narcotic and CBD disposal regulations, the specific hydrolyzing, fermentation, i.e., anaerobic digestion and distillation production systems, processes and procedures that comprise this invention completely eradicate the remote possibility that any trace elements of THC or CBD compounds can be present in food grade alcohol spirits derived from Hemp and *Cannabis* feedstock waste streams.

The inventor has made personal observations of market trends of late nationwide legalized agricultural production of industrial Hemp and specific state legalized medical and recreational Marijuana industry. As a result of the inventor's observations at national *Cannabis* Industry conferences, the inventor deduced that the vast majority of the products and services currently offered within the industry are tailored toward either providing an enhanced psychotropic experience or a medical benefit to the end user. This observation has led the inventor to consider the utilization of Hemp and *Cannabis* medical and recreational products manufacturing waste streams along with the associated agricultural Hemp and *Cannabis* production waste and in a further embodiment that utilizes industrial Hemp to create a unique food grade alcohol spirits that is specifically derived from the *Cannabis* species of the Cannabaceae plant family.

It became apparent to the inventor from attending these conferences that there is a necessity within the *Cannabis* industry to identify a standardized use for remnants of industrial Hemp and recreational use *Cannabis* agriculture and manufacturing versus the decentralized destruction of the waste streams. In particular, government regulations that mandate the total destruction of agricultural remnants along with medical and recreational Hemp and *Cannabis* manufacturing waste streams that are utilized to create products with medical and or enhanced psychotropic effects.

This observation has led to the inventor realizing that as part of complying with the legally mandated destructive processes, one can repurpose the aforementioned waste streams through anaerobic digestion into unique food grade alcohol spirits that are derived specifically from waste and fresh feedstocks from the *Cannabis* species of the Cannabaceae plant family.

The inventor has also created a unique method that vastly simplifies the DEA and state regulated destruction of industrial Hemp agricultural waste along with waste streams from the testing and manufacture of medical and recreational Hemp and *Cannabis* products. The fully compliant destruction results from the initial grinding and subsequent repurposing through a series of subsequent hydrolytic, fermentation and distillation processes that as effected on this unique feedstock transforms the waste stream(s) through anaerobic digestion into a unique food grade alcohol spirits derived from the *Cannabis* species of the Cannabaceae plant family.

Whiskey, for example, has a unique character and flavor that is dominated by the chemical compounds that are present in the distilled spirits. Those compounds are ultimately generated from the grain-based feedstock that is used to make Whiskey which primarily consist of barley, corn, wheat and/or rye. The presence of phenols such as guaiacol and eugenol that attach themselves to the ethyl alcohol molecules provide the bitterness and smokiness of Whiskey's flavor. Whiskey is further influenced by esters that are formed during the fermentation process such as isoamyl acetate and ethyl hexanoate although the concentration is significantly reduced in the end product through filtration, small milligram amounts remain. Other compounds that affect the flavor profile and character of Whiskey are b-damascenone, phenethyl alcohol, 2-methyl-3-(methyldisulfanyl), furan and diacetyl which emits a buttery flavor. In the case of Scotch Whiskey, the medicinal smell is generated by the o-cresol, m-cresol and p-cresol content.

Vodka is another example of alcoholic spirits with a unique yet faint flavor, aroma and character that is dominated by the chemical compounds that are present in the distilled spirits beverage. Those compounds are ultimately generated from the grain-based feedstock that is used to make Vodka which primarily consist of barley, corn, soy, rye, wheat, potatoes. Vodka can also be made from sugar beets, sugar or molasses. Grain Vodka is considered to be less viscous than the slightly oily or creamy texture and sweeter flavor of potato Vodka.

The flavor of Vodka is further influenced by the presence compounds such as acetaldehyde, isoamyl alcohol, methanol and propanol. The light taste of Vodka is also thought to be influenced by hydrate structures that attaches five (5) water molecules to each ethyl alcohol molecule Rum is another example of a spirits family with a unique flavor profile, aroma and character that is dominated by the chemical compounds that are present in the distilled spirits. Those compounds are ultimately generated from the feedstock that is used to make Rum which primarily consist of sugar cane juice, molasses and or honey. The presence of chemical compounds, ketones and esters such as b-damascenone ethyl propanoate and ethyl isobutyrate, along with short-chain carboxylic acid along with phenethyl alcohol combine to emit its caramel, butterscotch aroma.

Tequila is a much more extreme example of a unique alcohol spirit that has the distinction of being regulated by Mexican federal law. The spirits known as 100% agave tequila is governed by the declaration of the Official Mexican Standard for Tequila NOM-006-SCFI-2005 known as the General Declaration of Protection of the Appellation of Origin of "Tequila," published in the Official Gazette of Mexico on Oct. 13, 1977 and Article 40 Section XV of the Federal Law on Metrology and Standardization.

The feedstock is tightly limited to Agave of the species tequilana weber blue variety, grown in the federal states and municipalities surrounding the city of Tequila which is 65 km northwest of Guadalajara and in the Jaliscan Highlands of the central western Mexican state of Jalisco. In addition to feedstock specificity the stages in the Tequila manufacturing process including the following basic stages that among others include the harvest, hydrolysis, extraction, formulation, fermentation, distillation, aging, as applicable along with filtration and bottling are all tightly controlled by Mexican law.

In addition to the governmental legislation Tequila represents another example of an alcoholic spirits with a unique flavor profile, aroma and character that is dominated by the chemical compounds that are present in the distilled spirits beverage. Those compounds include esters, aldehydes and fructose polymers are ultimately generated from the tequilana weber blue Agave feedstock that is mandated for 100% agave Tequila. The flavor of Tequila is further influenced by the presence of organic compounds such as acetaldehyde, isovaleraldehyde which imparts a cocoa/chocolate like smell and furfural along with ketones like b-damascenone that carry a wooden sweet smell. Tequila also contains trace amounts of esters like isoamyl alcohol, ethyl acetate, aldehydes and the fructose polymer fructan it also contains 2-methyl-1-butanol and 2-phenylethanol and methanol.

Gin is another extreme example of unique alcohol spirits that also has the distinction of being regulated by European Economic Union law. As mandated by Regulation (EC) No 110/2008 of the European Parliament and of the Council of 15 Jan. 2008 on the definition, description, presentation, labelling and the protection of geographical indications of spirit drinks and repealing Council Regulation (EEC) No 1576/89 dictates among other things that that Gin must be distilled from natural plant materials.

Gin is another example of an alcoholic spirits with a unique flavor profile, aroma and character that is dominated by the chemical compounds that are present in the distilled spirits beverage. Those compounds are ultimately generated from the grain-based feedstock that is used to make Gin which primarily consist of barley, corn, wheat and molasses.

The flavor in Gin is influenced by a relatively wide yet well-defined and highly secretive combination of juniper berries that contain a wide range of chemical compounds. Additional flavors can be imparted with almonds, ginger, cinnamon, cubeb berries, nutmeg, licorice, lemon peel, coriander, cassia bark and can be further influenced through both orris and angelica root.

The flavor that's imparted on the Gin depends on the exact ingredients added, the specifics of which, for most Gin makers, are a closely guarded secret. However, within the EU at least, the dominant flavor must be that of juniper berries. These contribute a wide range of terpene compounds to the Gin such as a-pinene, b-pinene, d-limonene, gamma-terpinene, p-cymene, sabinene all of which tend to impart its woody, herbal, floral aroma. All of the different compounds and associated chemical and bio chemical reactions influence the overall flavor in their own unique manner which ultimately relate to the unique chemical composition of each type of bottled Gin.

There are well in excess of 100 organic hydrocarbon, chemical and organic compounds present in the Cannabaceae plant family feedstock. The microbial reactions of the ester compounds exert the utmost influence on the overall sensorial properties, flavor profile, aroma and overall character of the invention. Studies utilizing gas chromatography have identified the following thirty-seven (37) compounds to be present in diminished mcg/100 ml concentrations in the pre functionalized Cannabaceae plant family feedstock. The following twenty seven (27) of which are categorized as sesquiterpenes: β-elemene, a-cis-bergamotene, a-trans-bergamotene, a-humulene, a-caryophyllene, β-curcumene, p-selinene, viridiflorene (ledene), a-selinene, (eudesma-3,11-diene), a-longipinene, trans-a-farnesene, β-bisabolene, cis-y-bisabolene, trans-p-farnesene, y-eudesmol, β-selinenol, a-eudesmol, a-selinenol, trans-nerolidol, β-bisabolol, epi-a-bisabolol, (eudesma-4(14),11-diene), trans-y-bisabolene, guaiol, cis-β-farnesene and alloaromadendrene. In addition, there are other compound that include organic and aliphatic hydrocarbons such as β-myrcene and β-farneseneand and d-limonene as well as bicyclic sesquiterpene compounds such as β-caryophyllene and caryophyllene oxide are present along with carbobicyclic compounds like α-guaiene, β-eudesmol, y-muurolene and the isometric hydrocarbon y-cadinene and the structural polymer y-elemene.

Analogous to the five (5) previously described alcohol spirits, the sensorial properties, flavor profile, aroma and overall characteristics of the invention are greatly influenced by its chemical structure and microbial reactions that involve a significant number of organic hydrocarbons and organic compounds such as aldehydes and sesquiterpenes and isoprenoids, ketones and chemical compounds such as esters that are present in the underlying feedstock. These compounds primarily reside in the glandular trichomes and are comprised of acyclic, monocyclic, or polycyclic hydrocarbons with substitution patterns including alcohols, ethers, aldehydes, ketones, and esters.

SUMMARY OF THE INVENTION

The invention provides for a new and unique category of food grade alcohol for the worldwide Alcohol Spirits Industry following in lockstep with the five (5) primary and unique types of alcohol spirits already described. The unique feedstock derived specifically from the *Cannabis* species of the Cannabaceae plant family provides the invention described herein with a unique character, flavor profile and aroma that is dominated by the biochemical reactions and resultant chemical compounds that are present in the "heart cut" i.e. the middle part of the distillation process of the distilled spirits beverage product.

The subject of this invention is the production of a pure food grade alcohol spirits that is entirely processed from a feedstock of industrial pure Hemp and or the waste streams from medical Hemp and *Cannabis* products manufacturing and agriculture that are derived from the *Cannabis* species of the Cannabaceae plant family.

This invention also describes a pre-treatment hydrolytic decomposition, fermentation and distillation process that creates the unique food grade alcohol spirits from agricultural, medical and recreational Hemp and *Cannabis* waste streams from the *Cannabis* species of the Cannabaceae plant family. The end product, i.e., alcohol spirits described in this invention is entirely devoid of any trace elements of tetrahydrocannabinol (THC) and cannabidiol (CBD) as a result of the hydrolyzation and anaerobic digestion process.

The unique distinguishing factor that differentiates this distinctive food grade alcohol spirits from common yet individually tasting alcohol spirits such as Whiskey, Vodka, Tequila, Rum and Gin is its unique Cannabaceae plant family feedstock. The flavor profile, aroma and character of the aforementioned spirits and that of the invention result directly from their varying chemical compounds and resultant biochemical reactions that migrate into the final product.

The unique aroma, flavor profile and character of the invention is significantly influenced by the microbial reactions of the ester compounds that appear in the "heart cut". These esters intertwine to generate a unique aroma from a complex combination of esters. The esters that have the greatest influence over the aroma and flavor profile of the invention are: methyl salicylate and 3-(methylthio) propanoic acid ethyl ester which carry a sweet smell, ethyl-2-methylbutyrate which is more fruity. More complex aromas are generated from hexyl acetate which gives off a composite scent of fruit, herb and apples along with methyl butyrate that offers an intertwined apples and pineapple scent and ethyl hexanoate which has a pineapple smell. To further diversify the menu of aromas there is the presence of methyl hexanoate which offers a multifaceted palate that includes blackberries, pineapple and cheese, ethyl butyrate adds an orange aroma while isoamyl acetate and 2-pentanol acetate add the smell of bananas. The discernable amalgamation of aromas is further influenced by the ketones 2-methyl-4-heptanone and 2-methyl-3-heptanone that reinforces the fruity banana undertones.

Mostly in microgram amounts some of the aforementioned compounds become uniformly ingrained in the "heart cut" of the distillation cycle. Those transient compounds convey the uniquely distinguishable sensorial properties, flavor profile, aroma and overall character of the pure Cannabaceae plant family hemp and *Cannabis* derived alcohol spirits described herein.

Both the exclusivity of the feedstock and the chemical reactions that migrate from the feedstock into the end product distinctly positions this unique alcohol spirits in a new category apart from the five (5) primary alcohol spirits such as Whiskey, Vodka, Tequila, Rum and Gin.

From a domestic revenue production perspective, the invention provides the federal government with a new alcohol excise tax revenue stream. Furthermore, and to a greater degree, as a mass market alcohol spirits beverage that fully complies with TTB regulations, all 50 states will benefit from two new tax revenue streams in the form of both an alcohol excise and sales tax revenue.

The invention describes a method for the destruction of hemp and *Cannabis* waste streams and the subsequent hydrolysis, fermentation and distillation into a new category of food grade alcohol spirits.

The invention establishes an economically viable hydrolyzation process that utilizes any combination of chemicals, mineral, organic, acetic, lactic, citric, tartaric, malic, and succinic acids and or alkali compounds along with enzymatic cocktails that when augmented with heat and pressure, vacuum transform the cellulosic and lignocellulosic materials found in industrial Hemp and or *Cannabis* feedstock into soluble monosaccharides and disaccharides, such as glucose and xylose. The simple sugars are then treated with any combination of natural and or man-made microbes to generate a fermentation reaction that converts them into a mash that is then distilled to create a unique food grade alcohol spirits beverage.

BRIEF DESCRIPTION OF THE DRAWINGS

Not Applicable

DETAILED DESCRIPTION OF THE INVENTION

The invention is for an alcohol spirits made from a specific feedstock from the Cannabaceae plant family found in any combination of freshly harvested, partially dried fully dried Hemp and *Cannabis* agricultural waste and plant components including the roots, stems, leaves along with dry and or solvent saturated manufacturing waste streams and expired products from the medical and recreational Hemp and Marijuana industry.

The invention establishes a standardized method whereby Hemp and *Cannabis* waste streams are destroyed in a legally compliant manner through the anaerobic digestion that occurs during fermentation. The method converts raw and or processed Hemp and *Cannabis* feedstock that is cleansed, hydrolyzed, fermented and distilled to create a new category of pure food grade alcohol sprits that is uniquely distinguishable by virtue of its physical specifications and sensorial properties, flavor profile, aroma and overall character that separates it into a unique spirits category from the five (5) primary alcohol spirits such as Whiskey, Vodka, Tequila, Rum and Gin.

The highly cellulosic and lignocellulosic content of the underlying Hemp and *Cannabis* feedstock renders the plant less than optimal for conversion to simple sugars. The cellulosic and lignocellulosic resistance is conquered through the application of one or more hydrolyzing processes along with the measured introduction of chemicals, acids and or alkali along with enzymatic compounds into a high yield fermentable mash is created that is suitable for distillation into a pure Hemp and *Cannabis* food grade alcohol spirits.

Production costs are the Achilles heel to all commercial enterprises along with the importance of utilizing enzymes in the pre-treatment and hydrolytic processes described herein. This invention reduces the amount and subsequent cost of the enzymatic compounds required to carry out the pre-treatment and hydrolytic processes by utilizing a large capacity autoclave capable of vacuum and or pressure, steam, rapid heating and cooling along with a stirring motion that evenly distributes the enzymatic compounds throughout the mash.

The initial research into published pricing from commercial enzyme suppliers such as Dupont, Novozymes, DSM AB Enzymes and others production estimates claim that commercially available enzymes account for a theoretical yield cost of $0.30 to $0.42 per gallon. This invention has determined that when recalculated at the actual hydrolyzation and fermentation yields the production cost is closer to $1.42 per gallon.

The modified autoclave used in this invention minimizes the amount and cost of enzymes required during the pre-treatment process by increasing the effective gain afforded by the acids, inorganic compounds, chemical, alkali and organic compounds that are introduced during the pre-treatment by effecting those processes under heat and pressure within an autoclave. The autoclave also allows for the recovery of process off-gases as well as the recovery of the non-absorbed acid, chemical, inorganic, organic and alkali solution utilized in the pre-treatment process.

This invention employs a methodology that utilizes mechanical devices that reduce the feedstock into a small uniform size that effectively increases the feedstock surface area and reduces the time required for chemicals, acids, alkali and or enzymatic solutions to saturate the substrate. As a result, the overall simple sugar yield of the treated Hemp and or *Cannabis* is significantly increased through any number of hydrolyzing processes that include temperature and pressure and vacuum and/or the introduction of enzymes, organic, acetic or mineral acids, basic organic amines and or nitrogen entrainment along with the addition of combinate microorganisms.

This invention is structured to utilize any combination of fresh harvested, partially dried fully dried or any Hemp plant roots, stalks, leaves and stems that are functionalized, fermented and substantively distilled into pure Hemp and *Cannabis* based food grade alcohol spirits. A portion of the unique food grade alcohol spirits will be further aged in traditional charred oak barrels to create flavor enhanced food grade alcoholic spirits.

The embodiments contained within this application address the challenges associated with the systematic process required to functionalize the highly lignocellulosic and cellulosic elements of Hemp and *Cannabis*. The hydrolyzing elements of this invention create a fermentable high yield mash that when further distilled and purified creates an economically pure and viable Hemp and *Cannabis* derived food grade alcohol spirits.

First Embodiment

In the first embodiment, this invention provides a unique and sensible solution for the challenges associated with the legally compliant destruction of agricultural, medical and recreational Hemp and *Cannabis* waste streams. The invention functionalizes the feedstock of waste cellulosic and lignocellulosic components found in any combination of freshly harvested, partially dried fully dried Hemp and *Cannabis* agricultural waste and discarded plant components including the roots, stems, leaves and manufacturing waste streams from the medical and recreational Hemp and Marijuana industry that can depending on process cycle can be dry, moist and or soggy having previously undergone solvent-based processing.

The divergent dry, moist and or soggy waste feedstock streams can also include moist and solid wastes that may contain residual nonvolatile and volatile liquid wastes along with waste from Marijuana flowers, trim and solid plant material and waste solvents used during medical and or recreational Marijuana or Hemp production and processing, discarded plant waste, spent solvents and laboratory wastes from any combination of medical and or recreational Marijuana or Hemp processing or quality assurance testing, solid *Cannabis* or Hemp sample plant waste possessed by third-party accredited laboratories along with expired and or damaged Hemp products such as CBD oils, emulsions and creams and or recreational Marijuana products such as edibles.

In total compliance with Drug Enforcement Administration (DEA) Secure and Responsible Drug Disposal Act of 2010 made available for public view as a final rule on Sep. 8, 2014, regarding the disposal of pharmaceutical controlled substances in accordance with the Controlled Substance Act, as amended by the Secure and Responsible Drug Disposal Act of 2010 along with state regulations. The processes described within this invention assure complete compliance with applicable regulations regarding the secure disposal i.e. destruction of Hemp and Marijuana processing waste streams and rendering those wastes unusable by grinding all solid materials and separating the volatile and nonvolatile solvents such as water from the waste stream that can later be re-introduction into the hydrolytic process that is in total compliance with federal and state regulations that must render the *Cannabis* and Hemp plant waste as destructed and unusable. The destruction is accomplished through the anaerobic digestion and subsequent distillation of the separate dry, moist and/or soggy manufacturing processed waste streams into a pure food grade alcohol spirits derived from Hemp and *Cannabis*. By virtue of the destructive anaerobic digestion and distillation process the end product does not contain any trace elements of THC or CBD compounds.

The functionalizing of the underlying medical and recreational Hemp and *Cannabis* waste streams requires the employment of parallel processing systems to carry out the pre-treatment and hydrolytic functions that are different from the single stream industrial Hemp pre-treatment and hydrolytic processes described in the second embodiment.

This invention is based on the incorporation of chemical, acid, base and biological organisms into a pre-treatment process that utilizes heat and pressure and or vacuum along with distilled water steam that significantly enhances the reaction rate and reduces the in-process energy consumption along with the volume of enzymes required for the degenerative hydrolysis of the cellulosic and lignocellulosic materials and their subsequent transformation into simple sugars.

The dry and solid agricultural waste and Hemp and *Cannabis* feedstock is initially processed on a conveyorized cleansing system that removes foreign matter, unwanted bacteria and latent pesticides through a vinegar spray wash that is followed by solution of 3% hydrogen peroxide that is concluded with water and detergent which is administered as a spray wash. The feedstock that has now been cleansed of soil, stones, floating waste, heavy metals, herbicides, pesticides and unwanted bacteria are then subjected to a rinse of ionized water that is administered from swirling sprayers which is combined with low pressure 72° F. airflow to dry and condition the feedstock in preparation for the grinding process.

The moist feedstock waste stream originates from the medical and recreational Hemp and Marijuana products manufacturing processes that routinely employ solvents to create extracts, oils and edibles. The processes can utilize any combination of volatile solvents such as propane, butane, pentane, hexane, and ethanol or nonvolatile solvents like water or CO2. The first and most important step in the destruction of these manufacturing affected waste streams requires the solvents to be removed from the underlying feedstock. This invention utilizes negative pressure to reduce the amount of heat required for each of the volatile and nonvolatile liquids to evaporate from the underlying moist feedstock.

The moist feedstock is placed in a closed loop stainless-steel distillation chamber that for example heats the water in the feedstock to a maximum temperature of 212° F. or to a lower temperature if the pressure is held below that of sea level atmospheric pressure to evaporate nonvolatile components such as water. For example, volatile solvents such as propane evaporate at –43.6° F., butane evaporates at 30.2° F., pentane evaporates at 96.98°, hexane evaporates at 154.4° along with any trace ethanol evaporate at 173.07° F. at sea level barometric pressure. The evaporated streams rise and then cool after passing through a heat stabilized venturi which acts to reduce the pressure in the distillation chamber and accelerates the vapor as it enters the distillation column. The distillation column is outfitted with stainless-steel collection baffles outfitted with corrugated lattice structures at differing heights within the cooling column that re-condense the individual volatile and nonvolatile streams that can later be introduced to the hydrolytic process and or recycled for further use. The resultant force dried feedstock is added to the dry agricultural waste stream for grinding.

The natural and or now artificially dried agricultural waste streams require grinding that can be accomplished through any number of commercially available agricultural processing apparatuses such as rotary knives, grinders, pulverizer, pug, pin or attrition mills. The reduction in size of the feedstock into uniform fragments no larger than 1600 microns improves the homogeneity of the feedstock by effectively increasing the surface area of the substrate which enhances the permeability of the evenly sized feedstock so that it can better react with the measured amounts of chemical, acid, alkali and enzymatic compounds that are employed during the hydrolytic process.

The evenly re-sized dry substrate is then processed in a commercially available batch mixer, double-conical rotary drum mixer mill or other appropriate machine that can thoroughly intermix the varying feedstock elements which ensures the thorough and uniform distribution of the cellulosic and lignocellulosic elements. The feedstock re-sizing avoids the possibility that certain areas of the milled substrate batch would be excluded from permeation during the per-treatment processes which results in a greater yield of disaccharides and monosaccharides.

As a result of re-sizing the substrate and the subsequent thorough permeation of the pre-treatment solutions. The actual volume of compounds required to achieve near 100 percent permeation is significantly reduced. The volume reduction translates directly into a pre-treatment efficiency increase and subsequent cost reduction by diminishing the volume of chemicals, acids, enzymatic compounds and microorganisms required to achieve the desired yield of simple sugars from the saturated mash.

This insures that all areas of the cellulosic and lignocellulosic materials contained in the mash will be reached and acted upon by the hydrolytic treatment agents and reduces the formation of undesired by-products during the degradation of the cellulose and lignin.

In preparation for the pre-treatment and hydrolytic steps the re-sized substrate is first inserted into a large volume stainless steel continuously stirred conical bottom vessel where 160° F. distilled water is introduced to produce a semiliquid mixture with the desirable moisture content that will absorb the additives which form the base component of what will become a fermentable mash. The semiliquid substrate is then transferred into an autoclave that is equipped with an internal stirrer and heated through external radially positioned conventional inductive coils as well as an internal inductive coil stack to assure an even distribution of heat and to prevent localized overheating. The autoclave is also further modified with the unique capacity to accept a flow of high pressure distilled water steam. The autoclave is also equipped with externally affixed refrigeration elements along with internal refrigeration stack coils that are capable of rapidly and evenly reducing the internal temperature of the mash in preparation for the below room temperature application chemical, acid and alkali solutions. The autoclave also provides for the convenient recovery of off-gases generated during the processes.

The mash temperature is subjected to super-heated steam that increases the temperature into a range of 350 to 410° F. and subjected to a pressure range of up to 350 to 500 PSI for a dwell time not to exceed fifteen (15) minutes per treatment. The autoclave is then reduced to ambient pressure while maintaining a chemical reaction stabilized internal temperature in the range of 350 to 410° F. Once at atmospheric pressure is reached the heated mash is immersed in Sulfuric Acid for a dwell time not to exceed twenty (20) seconds per Imperial gallon of volume. The Sulfuric Acid is evacuated from the autoclave to make way for immersion in a Sodium Hydroxide solution. The Sodium Hydroxide is allowed to permeate the mash for a dwell time not to exceed thirty (30) seconds per Imperial gallon of volume.

The in-process mash is then rapidly cooled via external refrigeration elements along with internal refrigeration stack coils that are incorporated into the autoclave. The thorough cooling of the mash is accelerated by stirring which enables the entire content to temperature stabilized into a temperature range of to 40° to 55° F. The temperature stabilized gross volume and weight adjusted mash is then introduced to an immersion of Hydrogen Peroxide for a dwell time not to exceed thirty (30) seconds per Imperial gallon of volume. The Hydrogen Peroxide is then evacuated from the autoclave to make way for an immersion of Hydrochloric Acid for a dwell time not to exceed twenty-five (25) seconds per Imperial gallon of volume. The Hydrochloric Acid is then evacuated from the autoclave to make way for immersion in Ammonia for a dwell time not to exceed thirty-six (36) seconds per Imperial gallon of volume. The Ammonia is then evacuated from the autoclave.

The hydrolytic treatment is concluded by placing the mash within a larger and lower operating pressure vessel equipped with oscillating tray where high pressure 200 PSI steam is introduced at 210° F. for a dwell time not to exceed sixty (60) seconds per Imperial gallon of volume. Following the steam bath fresh distilled water and or the water distilled from the soggy waste stream is introduced at a temperature of 136° and volumetrically adjusted within the mash to a saturation level of 1:1.5 or up to 3:1. The mash is then subjected to a solution of mineral acid is introduced in concentrations of 0.03% by weight to permeate the derivative sugars. The treatment final process is an immersion of Dimethyl Sulfoxide which as a synthetic reagent that emulsifies the mash.

The mash is then cooled to room temperature for transfer to fermentation and subsequent to distillation in order to create pure food grade alcohol spirits.

The soggy manufacturing residual waste stream that is comprised of third-party accredited laboratory testing, sample plant, expired and or damaged Hemp products such as CBD oils, emulsions and creams and or recreational Marijuana products like edibles require an initial decontamination process that utilizes a conveyorized cleansing system that removes foreign matter unwanted bacteria through a vinegar spray wash that is followed by solution of 3% hydrogen peroxide spray wash that is concluded with an ionized water swirling spray wash. The manufacturing residual feedstock that has now been sterilized is fed into a conveyor where low pressure 72° F. airflow dries the feedstock in preparation for a specialized blending and or emulsification and moist feedstock specific pre-treatment process.

The now sterilized soggy manufacturing residual waste stream items are then blended and or emulsified using any of a number of commercially available agricultural processing apparatuses such as rotary batch mixer, fluidized bed mixer paddle flow blender. The mixing converts the waste stream into an evenly distributed and sized slurry. Consider that the Hemp and *Cannabis* manufacturing residual waste streams will vary in composition. Each batch or slurry requires glucose testing with common over the counter glucose testing strips or a refractometer to ascertain the batch specific intrinsic concentration of sugar. The batch specific glucose test dictates the amount and combination of chemical, acid, alkali and or enzymatic compounds that are employed during the hydrolytic process. The glucose testing also reduces the undesired conversion of byproducts that result from over saturation that would impair the fermentation process.

In preparation for the pre-treatment the soggy manufacturing residual waste slurry is first inserted into a large volume stainless steel continuously stirred conical bottom vessel where fresh distilled water and or the water distilled from the soggy waste stream is introduced at a temperature of 95° F. is introduced to an optimal moisture content that will absorb the additives which forms the base component of what will become a fermentable mash. The slurry is then transferred into an autoclave that is equipped with an internal stirrer and heated through external radially positioned conventional inductive coils as well as an internal inductive coil stack to assure an even distribution of heat and to prevent isolated heat buildup. The autoclave is also further modified with the unique capacity to accept a flow of high pressure distilled water steam. The autoclave is also equipped with external refrigeration elements along with internal refrigeration stack coils that are capable of rapidly and evenly reducing the internal temperature of the mash in preparation for the below room temperature application chemical, acid and alkali solutions. The autoclave also provides for the convenient recovery of off-gases generated during the processes.

The soggy manufacturing residual waste slurry is subjected to an increase in temperature to a range of 145 to 160° F. and subjected to a pressure range of 85 to 105 PSI for a dwell time not to exceed seven (7) minutes per treatment. The autoclave is then reduced to ambient pressure while maintaining an internal temperature in the range of 85 to 105° F.

The in-process soggy manufacturing residual waste slurry-mash is then rapidly cooled via external refrigeration elements along with internal refrigeration stack coils that are incorporated into the autoclave. The thorough cooling of the slurry-mash is accelerated by stirring which enables the entire content to be temperature stabilized into a temperature range of to 40° to 55° F. The in-process slurry-mash is once again tested with ordinary over the counter glucose test strips or a refractometer to ascertain its sugar content. The glucose test results dictate the amount and or combination of compounds such as Dimethyl Sulfoxide that are added. The slurry mash is then brough to room temperature for transfer to fermentation and subsequent to distillation in order to create a pure food grade alcohol spirits.

Fermentation

The extraction of simple sugars through the fermentation of a mash was patented by Louis Pasteur in 1856. In modern times this applied science that involves the selection and combination of fermentation generating microorganisms and yeast is known as zymology.

For the purposes of this invention the fermentation process of converting sugars directly to a food grade alcohol spirits is accomplished through the anaerobic processes of adding various combinations of bacteria, enzymes and natural occurring and or man-altered microorganisms added to the mash to effect anaerobic digestion on the hydrolyzed mash for transfer to the distillation process. It is important to note that by nature the exact combination of bacteria and microorganisms are typically highly protected trade secrets.

Post hydrolyzation the processed mash is placed is a stainless-steel tank with a conical base that is equipped with a vertical axis stirring apparatus that rotates no faster than 12 RPM and inductive coils capable of maintaining a uniform temperature throughout the mash. The measured amount of distilled water is added to the tank by volume that is then heated to and maintained through refrigeration coils within a monitored and adjusted temperature range of 87° to 95° for a period of four (4) to up to eight (8) hours to support the anaerobic digestion process. The composition of the bacteria, enzymes and natural occurring and or man-altered microorganism mixture dictates the optimal temperature setting. To further promote the anaerobic digestion the tank is equipped with gaseous injection nozzles that are utilized to slowly permeate the mash with a measured amount ammonia gas to further promote anaerobic digestion. The contents are then cooled to a temperature range of 67° to 86° which is maintained throughout the fermentation process that can take up to five (5) to seven (7) days depending on temperature.

Microorganisms Bacteria & Enzymes

With the exception of manipulated microorganisms, the vast majority of enzymes and chemicals described in this invention are readily available from commercial sources. Chemicals and enzymes used in the methods of the present invention are readily available and can be purchased from a commercial supplier, such as Dupont, Novozymes, DSM AB Enzymes Roche, Sigma-Aldrich, Specialty Enzymes & Biochemicals Co., Genencor, or Novozymes.

Depending on compatibility, synergistic combinations of cellulolytic enzymes, bacterium and microorganisms can be utilized during the anaerobic digestion cycle to enhance the production of simple sugars. Those include: ATCC No. 20867, *Acremonium acremonium* AHU 9519, *Acremonium brachypenium* CBS 866.73, *Acremonium dichromosporum* CBS 683.73, *Acremonium furatum* CBS 299.70H, *Acremonium incoloratum* CBS 146.62, *Acremonium obclavatum* CBS 311.74, *Acremonium persicinum* CBS 169.65, *Acremonium pinkertoniae* CBS 157.70, *Acremonium roseogriseum* CBS 134.56, *Acremonium* sp. CBS 265.95, *Acremonium* sp. CBS 478.94, *Acremonium, Cephalosporium*, Beta-D-glucosidases, Beta-D-xylosidases, Carbohydrases, Cellobiases, (β-glucosidases). Cellobiohydrolases, *Cephalosporium* sp. CBS 535.71, *Cephalosporium* sp. RYM-202, *Cephalosporium, Scytalidium, Chrysosporium lucknowense, Clostridium phytofermentans Coprinus cinereus*, Endo-1,4-beta-xylanases, *Endoglucanases, Endoglucanases*, endo-1,4-beta-glucanases, *Exocellobiohydrolases, Exoglucanases, Fusarium, Fusarium oxysporum* DSM 2672, *Fusarium oxysporum, Glucanases, Galacturonases, Glucosidases, Hemicellulases, Humicola insolens* DSM 1800, *Lactobacillus* spp, *Meripilus giganteus, Myceliophthora thermophila* CBS 117.65, *Pectate lyases, Penicillium* or *Aspergillus, Peroxidase, Phytases, Proteases, Pyruvate decarboxylase, S. cerevisiae, Saccharophagus degradans, Scytalidium thermophilum, Scytalidium, Thielavia terrestris, Thielavia terrestris, Thielavia, Trichoderma koningii, Trichoderma reesei, Trichoderma viride, Trichoderma, Thielavia*, Xylanases and Xylosidases.

Distillation

The distillation of alcohol spirits is thought to have been practiced by the Egyptians for the production of perfumes. It is documented that Brandy distillation dates back to Italy in the 1000's, Whisky had its origins in Ireland and Scotland during the 1500's while Vodka had its beginning in Russia in the 1400's whereas Rum was produced in the America's in the 1500's with Gin dating back to the 1300's in Holland and Tequila having been distilled in Mexico since the 1500's it becomes obvious that distillation has been around for a while. Over the years there have been and continue to be numerous improvements in the art.

The overall concept of distillation is to increase the temperature of the mash to a temperature that evaporates the alcohol spirits from the fermented simple sugar solution. The evaporates are captured from the rising steam vapor column in a distillation column and cooled to re-liquify the ultimately pure alcohol spirits. The remaining liquid water and trace alcohol can be recycled and the remaining mash solids can be composted This invention employs as an initial step in the distillation process that heats the mash in a copper "pot still" cooking vessel that assists in the removal of sulfur compounds from the vapor column by attracting them to the copper walls. To evenly heat the mash the tank is outfitted with an internal multilayer heating coil arrangement that is able to maintain an even temperature throughout the liquid stack. Although any heating method can be employed such as natural gas, propane or wood fired. The uniformity of the steam column and the speed of the vaporization is enhanced through an even distribution of heat throughout the mash. The vapor column employs a heated venturi at the base of the distillation column that is temperature matched to the cooking vessel. The heated venturi accelerates the vapor column as it exits the cooking vessel which creates a negative pressure in the cooking vessel that reduces the level of impurities that are triggered by surface bubbling and increases the vapor stream flow rate and enhances the atomization of the vapor column components which improves the duration of the dwell cycle of the "heart cut". The mash is evenly heated into a progressive temperature range somewhere between 174° F. to 196° F.

The heat creates a vapor column that rises through the heat stabilized venturi into a multi-level distillation column. The distillation column is outfitted with angled copper or stainless-steel baffles with corrugated lattice structures at differing heights within the column that primarily re-condenses the alcohol. The temperature differential in the distillation tower permits the alcohol vapor to precipitate from the vapor stream into the condenser which yields a low, i.e., alcohol by volume ABV content alcohol. The low ABV alcohol is then subjected to one or more distillation cycles to achieve a high proof ABV alcohol that ranges between 80 and 92.5% alcohol.

The unique product characteristics that define the invention are dictated by the feedstock denoted below that is comprised of freshly harvested, partially dried fully dried Hemp and Marijuana agricultural waste and discarded plant components including the roots, stems, leaves and manufacturing waste streams from the medical and recreational Hemp and Marijuana industry that depending on process cycle can be defined as dry, moist and or soggy from having previously undergone solvent-based manufacturing processes.

The sensorial properties, flavor profile, aroma and overall character of the alcohol spirits of the invention is configured and demarcated under the following product characteristics:

| Product characteristics @ 68° F. | Minimum | Maximum |
|---|---|---|
| pH | 3.55 | 4.68 |
| Density (g cm$^{-3}$) | .94480 | .96250 |
| Viscosity mPa · s | 2.312 | 2.515 |
| Conductivity (µS/cm) | 32.90 | 52.10 |
| Sound velocity (m/s) | 1592 | 1615 |
| Refractive Index | 1.34475 | 1.35260 |
| Alcohol content @ 68° F. (% Alcohol Volume) In values of mg/100 ml | 40%-80 proof | 60%-120 proof |
| Methyl Alcohol | 20 | 100 |
| Acetaldehyde | 10 | 100 |
| Isoamyl alcohol | 10 | 120 |
| Propanol | 10 | 100 |
| Esters | 20 | 200 |

The pH, density, conductivity, viscosity and refractive index (clarity of color) establish the "finger print" for the alcoholic spirit. However, it is the transient compounds that convey the uniquely distinguishable sensorial properties, flavor profile, aroma and overall character of the pure alcohol spirits beverage of the invention.

The "taste" results from an interaction of different chemical stimuli that activate our sensory receptors. The amount of time that the chemical makeup of spirits are exposed to the gustatory and olfactory preceptors influence the "feel" and taste. Compounds including Methanol, Acetaldehyde and Propanol affect the taste and the perceived quality and are in certain concentrations harmful to humans. Also, a compound, such as Isoamyl alcohol, which conveys the welcoming flavor of bananas, can be lethal to humans at an exposure rate of 4,000 ppm for 30 minutes. Lastly, the esters bring with them such as an intertwined apples and pineapple scent and another combination that includes blackberries, pineapple and cheese along with the smell of orange and banana. All of these pass-throughs define the sensorial properties, flavor profile, aroma and overall character of the pure Cannabaceae plant family derived alcohol spirits.

As for pH, the perception of taste quality is influenced by the acidity of a beverage and thus pH plays a role. As for density, it influences how long a beverage can linger, which exacerbates aftertastes. As for viscosity, it affects the perception or "feel" of thickness or oiliness and play a role in the lingering of the beverage as well. As for conductivity, it references the volume of suspended solids, impurities and/or salinity. Esters are in effect flavor compounds that provide flavor; however, too many flavor influences and the combinate smell and taste becomes awful.

Purification Food Grade Cannabaceae Plant Family Alcohol Spirits

This invention recognizes and respects existing art and only seeks to advance the art as it pertains to a unique process for the utilization of Hemp plants including the roots and associated agricultural and production wastes to create a series of Cannabaceae plant family food grade alcohol spirits.

For the purposes of this invention the food grade alcohol spirits is cooled to 38° F., then it is pumped through a four-stage filtration system at a constant flow rate of three (3) gallons per minute that is comprised of four (4) concurrent Hemp filters that then flow sequentially through four (4) commercially available activated charcoal filters that are common in the drinking water filtration industry. The cooled and purified food grade alcohol spirits are then diluted with water that is either in the form of distilled, demineralized, treated with Permutit or water softeners to its desired alcohol concentration "proof" and is then ready for bottling.

Food Grade *Cannabis* Alcohol Spirits Aging

For example, an American Oak barrel will impart a coconut or vanilla flavor, European Oak barrels release a spicy flavor and darker color whereas French/Irish Oak barrels provide a lighter colored vanilla flavor, lastly Mongolian Oak barrels are known to release pecan and chocolate flavors.

For the purposes of this invention a portion of the pure Cannabaceae plant family food grade alcohol spirits will be stored in charred barrels. Temperature and barometric pressure fluctuations on the barrels will impart the unique flavors found in the organic compounds such as Sinapaldehyde and Syringaldehyde or lactones like β-methyl-γ-octalactone along with tannins that seep over time into the aged alcohol spirits.

Second Embodiment

In the second embodiment, this invention functionalizes the cellulosic and lignocellulosic components found in any combination of freshly harvested, partially dried, fully dried or any Hemp plant including the roots and associated agricultural wastes into a fermentable and substantively distilled into a food grade alcohol spirits.

The invention is based on the incorporation of chemical, acid, base and biological organism into a treatment process that utilizes heat and pressure along with fresh distilled water steam and or soggy manufacturing residual waste water that significantly enhances the reaction rate and reduces the energy consumption of the enzymatic hydrolysis of the cellulosic materials.

The pure Hemp feedstock is initially processed on a conveyorized cleansing system that removes foreign matter unwanted bacteria and latent pesticides in a vinegar spray wash that is followed by solution of 3% hydrogen peroxide spray that is concluded with water and detergent that is administered as a spray wash. The Hemp feedstock that have now been cleansed of soil, stones, floating waste, heavy metals, herbicides, pesticides and unwanted bacteria are then subjected to a rinse of ionized water that is administered from swirling sprayers which is combined with low pressure room temperature 72° F. airflow to dry and prepare the Hemp feedstock in preparation for the grinding process.

The grinding can be accomplished through any number of commercially available agricultural processing apparatuses such as rotary knives, pulverizer and attrition mills. The reduction in size of the Hemp feedstock into uniform fragments no larger than 1600 microns improves the homogeneity of the feedstock by effectively increasing the surface area of the substrate which enhances the permeability of the evenly sized feedstock so that it can better react with the measured amounts of chemical, acid, alkali and enzymatic compounds that are employed during the hydrolyzing process.

The evenly re-sized substrate is then processed in a commercially available batch mixer, double-conical rotary drum mixer, pug mill or other appropriate machine that can thoroughly intermix the varying Hemp plant elements which ensures the thorough and uniform distribution of the cellulosic and lignocellulosic elements. The feedstock re-sizing avoids the possibility that certain sections of the milled substrate batch would be excluded from permeation during the treatment processes which results in a greater yield of disaccharides and monosaccharides.

As a result of re-sizing of the substrate and the subsequent thorough permeation of the pre-treatment solutions, the actual volume required to achieve near 100 percent penetration is significantly reduced. The volume reduction translates directly into a pre-treatment efficiency increase and subsequent cost reduction by the reduced volume of enzymatic elements required to achieve the desired high yield simple sugar saturated mash.

This insures that during the hydrolytic treatment there will not be areas where the cellulosic and lignocellulosic materials are not acted upon, nor will there be a surplus of treating agent within the mash that induces undesired conversion by-products of the degradation of the cellulose and lignin.

In preparation for the pre-treatment the re-sized substrate is first inserted into a large volume stainless steel continuously stirred conical bottom vessel where fresh distilled water is introduced and thoroughly stirred to produce an aqueous slurry with the desirable moisture content that will absorb the additives which forms the base component of what will become a fermentable mash. The aqueous substrate is then transferred into an autoclave that is equipped with a stirrer and heated through radially positioned conventional inductive coils to prevent hot spots that has been further modified with the unique capacity to accept a flow of high pressure fresh distilled water steam. The autoclave is also equipped with refrigeration elements that are capable of rapidly reducing the internal temperature of the mash in preparation for the below room temperature application chemical, acid and alkali solutions. The autoclave also provides for the recovery of off-gases generated during the processes.

The mash temperature is subjected to super-heated steam that increased its temperature to 350 to 410° F. and subjected to a pressure of up to 350 to 500 PSI for a dwell time not to exceed fifteen (15) minutes per treatment. The autoclave is then brought to ambient pressure while maintaining an internal temperature of 350 to 410° F. Once at atmospheric pressure is reached the heated mash is immersed in Sulfuric Acid for a dwell time not to exceed twenty (20) seconds per Imperial gallon of volume. The Sulfuric Acid is evacuated from the autoclave to make way for immersion in a Sodium Hydroxide solution. The Sodium Hydroxide is allowed to permeate the mash for a dwell time not to exceed forty (40) seconds per Imperial gallon of volume.

The in-process mash is then rapidly cooled via refrigeration coils that are incorporated into the autoclave. The thorough cooling of the mash is achieved by stirring which enables the entire content to be temperature stabilized into a temperature range of to 40° to 55° F. The temperature stabilized and gross volume and weight adjusted mash is then introduced to an immersion of Hydrogen Peroxide for a dwell time not to exceed thirty (30) seconds per Imperial gallon of volume. The Hydrogen Peroxide is then evacuated from the autoclave to make way for an immersion of Hydrochloric Acid for a dwell time not to exceed twenty-five (25) seconds per Imperial gallon of volume. The Hydrochloric Acid is then evacuated from the autoclave to make way for an immersion in Ammonia for a dwell time not to exceed thirty-six (36) seconds per Imperial gallon of volume. The Ammonia is then evacuated from the autoclave to make way for the final pre-treatment an immersion of Dimethyl Sulfoxide which as a synthetic reagent emulsifies that mash for a dwell time not to exceed sixty (60) seconds per Imperial gallon of volume.

The hydrolytic treatment is concluded by placing the mash within a larger and operating lower pressure vessel equipped with oscillating tray where high pressure 200 PSI steam is introduced at 210° F. for a dwell time not to exceed sixty (60) seconds per Imperial gallon of volume. Following the steam fresh distilled and or soggy manufacturing residual waste water is introduced at a temperature of 136° and volumetrically adjusted within the mash to a saturation level of 1:1.5 or up to 3:1. The mash is then subjected to a solution of mineral acid is introduced in concentrations of 0.03% by weight to permeate the derivative sugars.

Fermentation

The extraction of simple sugars through the fermentation of a mash was pioneered by Louis Pasteur in 1856. In modern times this applied science that involves the selection and combination of fermentation generating microorganisms and yeast is known as zymology.

For the purposes of this invention the fermentation process of converting sugars directly to food grade alcohol spirits is accomplished through the metabolic processes of adding various combinations of bacteria, enzymes and natural occurring and or man-altered microorganisms are added to the mash to effect anaerobic digestion on the hydrolyzed mash for transfer to the distillation process. It is important to note that by nature the exact combination of bacteria and microorganisms are highly protected trade secrets.

Post hydrolyzation the processed mash is placed is a stainless-steel tank with a conical base that is equipped with a vertical axis stirring apparatus that rotates no faster than 12 RPM and inductive coils capable of maintaining a uniform temperature throughout the mash. The measured amount of distilled water is added to the tank by volume that is then heated to and maintained at a temperature range of 77° to 108° for a period of up to eight (8) hours to support the anaerobic digestion process. The composition of the bacteria, enzymes and natural occurring and or man-altered microorganism mixture dictates the optimal temperature setting. To further promote the anaerobic digestion the tank is equipped with evenly distributed gaseous injection nozzles that are utilized to slowly permeate the mash with a measured amount ammonia gas to further promote anaerobic digestion. The contents are then cooled to a temperature range of 67° to 86° which is maintained throughout the fermentation process that can take five (5) to seven (7) days depending on temperature.

Distillation

Following the hydrolytic degradation process the distillation process is identical to that of the first embodiment.

Purification

Following the distillation process the purification process is identical to that of the first embodiment.

Aging

Following the purification process the aging process is identical to that of the first embodiment.

While the foregoing description and drawings represent the preferred embodiments of the present invention, various changes and modifications may be made without departing from the scope of the present invention.

What is claimed is:

1. A *Cannabis* derived food grade alcoholic spirit whose alcoholic content is derived after fermentation and distillation of functionalized feedstock of waste cellulosic and lignocellulosic components of roots, stems and leaves of the

*Cannabis*, wherein the *Cannabis* derived food grade alcoholic spirit has comprises characteristics of:

a pH within a range of 3.56 to 4.68, a density within a range of 0.94480 to 0.96250 grams per cubic centimeter, a viscosity within a range of 2.312 to 2.515 milliPascal-second, a conductivity within a range of 32.90 to 52.10 micro-Siemens per centimeter, a sound velocity within a range of 1592 to 1615 meters per second, and a refractive index within a range of 1.34475 and 1.25260, wherein the *Cannabis* derived food grade alcoholic spirit lacks any trace elements of tetrahydrocannabinol (THC) and of cannabidiol (CBD) compounds.

2. The *Cannabis* derived food grade alcohol spirit of claim 1, the feedstock being any combination selected from the group consisting of harvested, partially dried, fully dried *Cannabis* agricultural waste plant components.

3. The *Cannabis* derived food grade alcohol spirit of claim 2 by subjecting the feedstock to cleansing, grinding, mixing, hydrolyzing, fermenting and distilling.

4. The *Cannabis* derived food grade alcohol spirit of claim 3, wherein a mash forms from the feedstock after the cleansing, grinding, mixing, hydrolyzing and fermenting, the distilling including heating the mash in a copper cooking vessel within a range of 174° Fahrenheit to 196° Fahrenheit to aid in removal of sulfur compounds from a vapor column by attraction of the sulfur compounds to the copper and outfitting the copper cooking vessel with an internal heating coil arrangement that maintains an even temperature distribution throughout the mash, the vapor column employing a heated venturi at a base of a distillation column whose temperature is matched to that within the copper cooking vessel to accelerate the vapor column passing into the distillation column and simultaneously reducing pressure within the copper cooking vessel to thereby reduce surface bubbling that would otherwise occur and thereby reducing a level of impurities that are triggered by the surface bubbling than would otherwise arise.

5. A hemp derived food grade alcohol spirit whose alcoholic content is derived after fermentation and distillation of functionalized feedstock of waste cellulosic and lignocellulosic components of roots, stems and leaves of the hemp, wherein the hemp derived food grade alcoholic spirit comprises characteristics of:

a pH within a range of 3.56 to 4.68, a density within a range of 0.94480 to 0.96250 grams per cubic centimeter, a viscosity within a range of 2.312 to 2.515 milliPascal-second, a conductivity within a range of 32.90 to 52.10 micro-Siemens per centimeter, a sound velocity within a range of 1592 to 1615 meters per second, and a refractive index within a range of 1.34475 and 1.25260, the hemp derived food grade alcoholic spirit lacking any trace elements of tetrahydrocannabinol (THC) and of cannabidiol (CBD) compounds.

6. The hemp derived food grade alcohol spirit of claim 5 made from feedstock from the Cannabaceae plant family, the feedstock being any combination selected from the group consisting of harvested, partially dried, and/or fully dried hemp agricultural waste plant components.

7. The hemp derived food grade alcohol spirit of claim 6 by subjecting the feedstock to cleansing, grinding, mixing, hydrolyzing, fermenting and distilling.

8. The hemp derived food grade alcohol spirit of claim 7, wherein a mash forms from the feedstock after the cleansing, grinding, mixing, hydrolyzing and fermenting, the distilling including heating the mash in a copper cooking vessel within a range of 174° Fahrenheit to 196° Fahrenheit to aid in removal of sulfur compounds from a vapor column by attraction of the sulfur compounds to the copper and outfitting the copper cooking vessel with an internal heating coil arrangement that maintains an even temperature distribution throughout the mash, the vapor column employing a heated venturi at a base of a distillation column whose temperature is matched to that within the copper cooking vessel to accelerate the vapor column passing into the distillation column and simultaneously reducing pressure within the copper cooking vessel to thereby reduce surface bubbling that would otherwise occur and thereby reducing a level of impurities that are triggered by the surface bubbling than would otherwise arise.

\* \* \* \* \*